United States Patent [19]

Fleshner

[11] Patent Number: 5,000,567
[45] Date of Patent: Mar. 19, 1991

[54] LASER RADAR SYSTEM FOR DETECTING AN OBJECT

[75] Inventor: Mark L. Fleshner, Falls Church, Va.

[73] Assignee: The Boeing Company, Seattle, Wash.

[21] Appl. No.: 469,264

[22] Filed: Jan. 24, 1990

[51] Int. Cl.$^5$ .............................................. G01P 3/36
[52] U.S. Cl. ....................................... 356/28.5; 356/4
[58] Field of Search ......................... 356/28.5, 1, 4, 5; 330/7.51

[56] References Cited

U.S. PATENT DOCUMENTS

| | | |
|---|---|---|
| 3,615,135 | 10/1971 | Frazer . |
| 3,897,150 | 7/1975 | Bridges et al. . |
| 3,968,362 | 7/1976 | Mocker . |
| 4,042,822 | 8/1977 | Brandewie et al. . |
| 4,201,468 | 5/1980 | Margolis et al. ............... 356/ |
| 4,209,253 | 6/1980 | Hughes . |
| 4,236,819 | 12/1980 | Green . |
| 4,311,384 | 1/1982 | Keene . |
| 4,340,299 | 7/1982 | Mongeon ......................... 356/ |
| 4,655,588 | 4/1987 | Chenausky et al. . |
| 4,666,295 | 5/1987 | Duvall, III et al. . |
| 4,721,385 | 1/1988 | Jelalian et al. ................. 356/ |
| 4,743,110 | 5/1988 | Arnaud et al. . |
| 4,810,088 | 3/1989 | Karning et al. . |
| 4,830,486 | 5/1989 | Goodwin . |
| 4,846,571 | 7/1989 | Jelalian et al. . |
| 4,850,041 | 7/1989 | Roberts et al. . |

OTHER PUBLICATIONS

M. C. Teich, "Three-Frequency Heterodyne System for Acquisition and Tracking of Radar and Communications Signals", APL, vol. 15, Dec., 1969.

Mark L. Fleshner and Shelly S. Eucker, "Construction of a Three-Frequency CO2 Laser Radar Breadboard Using FM Chirped Pulse Compression", IRIS Active Systems National Conference, Boulder, CO, Oct. 1988.

C. G. Bachman, "Laser Radar Systems and Techniques", Artech House, Inc., Dedham, Mass., 1979.

Primary Examiner—Thomas H. Tarcza
Assistant Examiner—Mark Hellner
Attorney, Agent, or Firm—Finnegan, Henderson, Farabow, Garrett & Dunner

[57] ABSTRACT

A laser radar system for detecting objects transmits a laser beam which is frequency modulated by the motion of scanning mirrors, which scan the beam across an object to be imaged. The return beam, reflected by the object, is combined with the local oscillator beam, and the frequency difference is detected. This frequency difference is obtained by the Doppler induced frequency modulation which results from the motion of the scanning mirrors. A signal corresponding to this frequency difference may be provided to the x axis of an oscilloscope for displaying the image. The x and y axis outputs of the oscilloscope are supplied with signals used to control the scanning of the x and y-scanning mirrors, to synchronize display with the scanning of the object.

19 Claims, 6 Drawing Sheets

LASER RADAR SYSTEM FOR DETECTING AN OBJECT

BACKGROUND OF THE INVENTION

1. Field of the Invention

The present invention relates to a coherent detection laser radar system for detecting objects 2. Description of the Related Art There are two basic types of laser radar systems for detecting objects; those based on direct detection of optical radiation and those based on coherent detection of optical radiation. In a laser radar system based on direct detection of optical radiation, a beam of radiation is transmitted to an object, scattered off of the object, and the scattered or reflected portion is detected. In a laser radar system based on coherent detection, radiation scattered off of the object (return radiation or return beam), as well as radiation remaining within the laser radar system (a local oscillator beam) are detected.

Figure 1A:
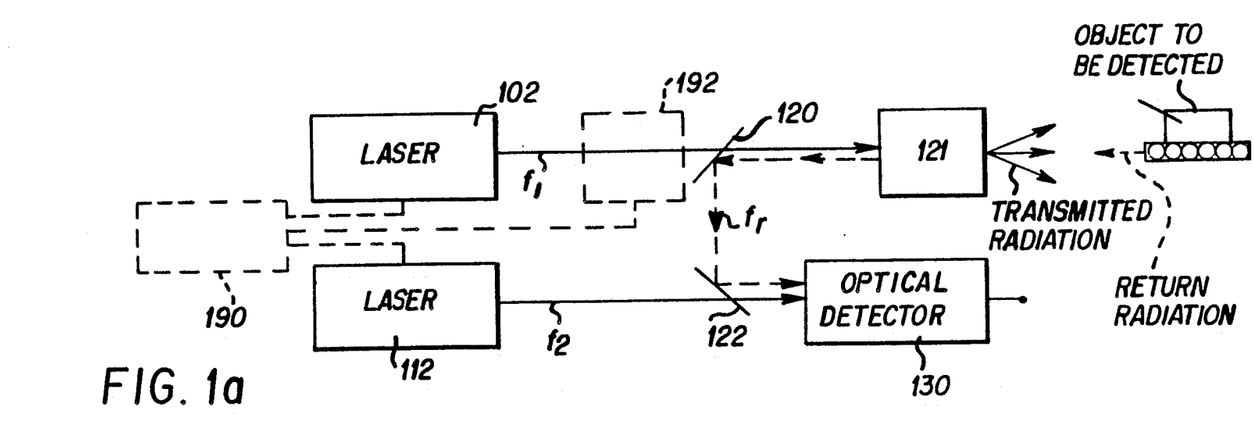
FIGS. 1a, 1b and 1c represent conventional coherent detention laser radar systems.
Figure 1B:
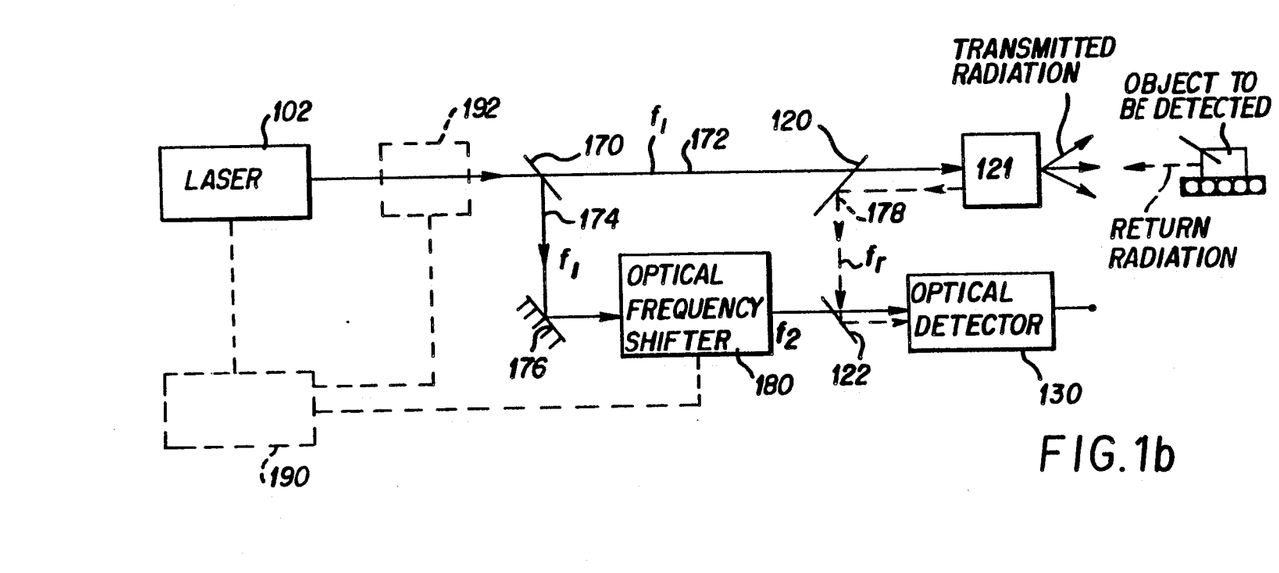
Figure 1C:
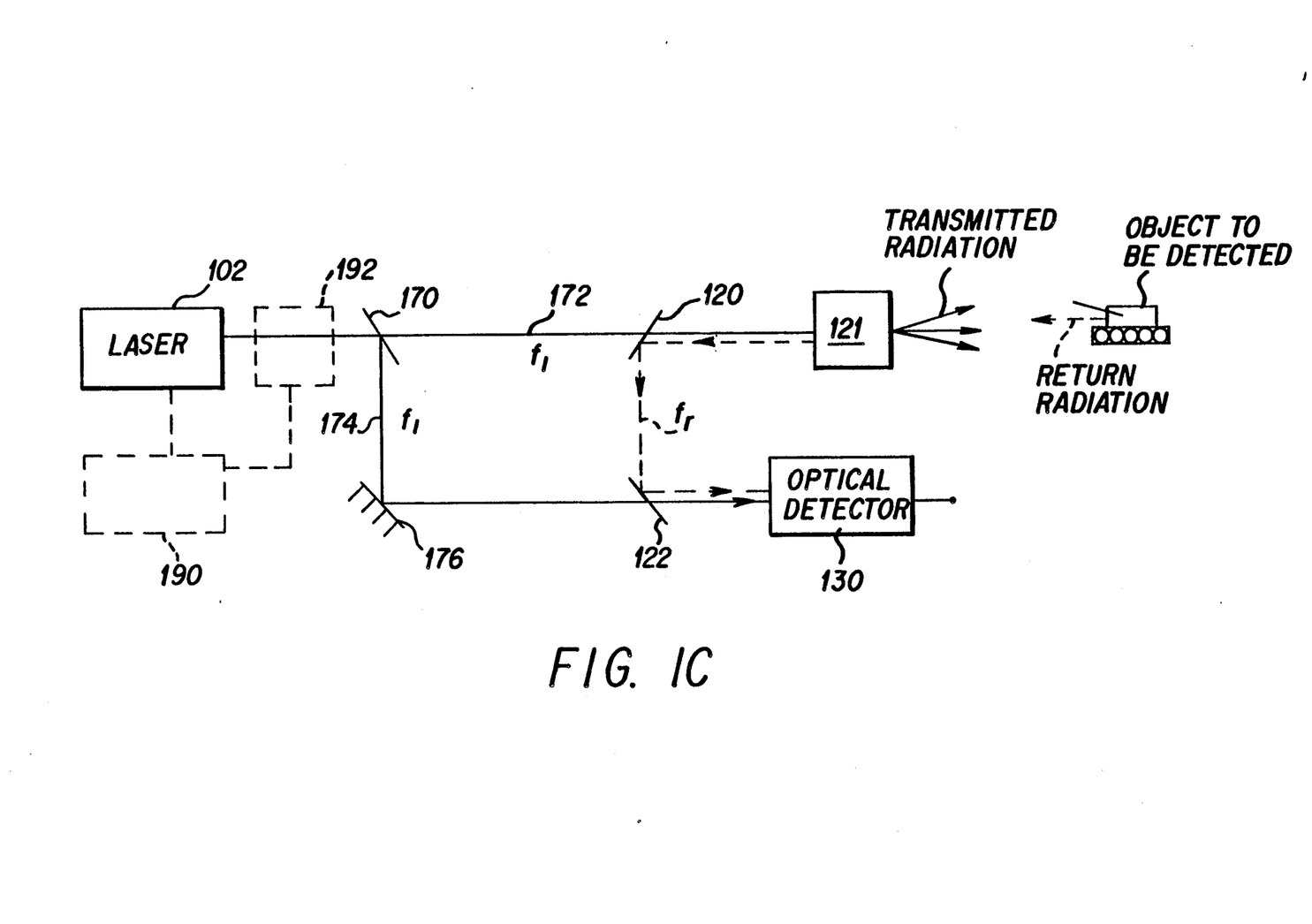

FIGS. 1a, 1b and 1c show conventional coherent detection laser radar systems. FIG. 1a shows a heterodyne coherent detection laser radar detecting system, and FIGS. 1b and 1c show homodyne coherent detection laser radar systems.

In a heterodyne coherent detection laser radar system, the return radiation is mixed with radiation from a second laser. As shown in FIG. 1a, a laser beam generated by a first laser 102, having a frequency $f_1$, is transmitted through a beam splitter 120 to a scanning device 121, and scanned across the object to be detected. As the beam is scattered off the object, part of the scattered radiation (the return radiation or return beam) is reflected back into the system (designated in the figures by a dashed line with arrows), reflected by beam splitter 120 to beam combiner 122 and directed into an optical detector 130. At the same time, a second laser 112 (a local oscillator) generates a second laser beam (the local oscillator beam) having a frequency $f_2$, which is transmitted to beam combiner 122 and mixed with the return radiation at the optical detector 130.

Optical detector 130 converts the optical energy of the mixed beams into an electrical signal which can be processed and displayed by components (not shown) according to conventional techniques.

In conventional homodyne laser radar detection systems, only one laser is utilized. As shown in FIG. 1b, laser 102 outputs a laser beam having a frequency $f_1$ which is split by a beam splitter 170 into two beams 172 and 174. Beam 172 is transmitted through beam splitter 120, scanned across the object to be detected, reflected back into the system, and input into optical detector 130 in a manner similar to that described above with respect to the heterodyne system of FIG. 1a. Beam 174 is reflected off mirror 176 into an optical frequency shifter 180 where the frequency $f_1$ of the beam 174 is shifted by $\Delta f$ to a new frequency $f_2$. The output beam of the optical frequency shifter is combined with the return beam 178 by beam combiner 122 and input to the optical detector 130.

Figure 6A:
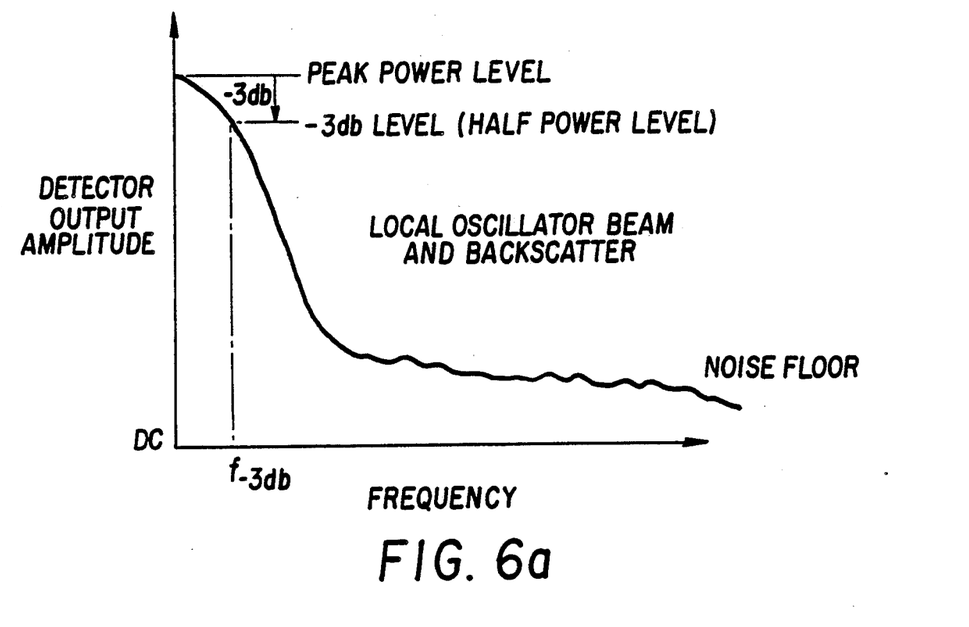
FIGS. 6a and 6b represent amplitude versus frequency plots of optical detector output signals.

As is known, laser radar detecting systems using coherent optical detection require the simultaneous detection of two optical beams having different frequencies. The coherent lasers used in conventional laser radar systems have finite linewidths which translate to finite bandwidth signals at the output of detector 130. Further, system backscatter that is mixed with the local oscillator beam makes it difficult to detect signals corresponding to a slowly moving object to be imaged. For example, FIG. 6a shows the output of detector 130 of FIG. 1c in the frequency domain. This signal has a finite −3dB bandwidth determined by the coherence linewidth of the laser and the sample time of the signal. A $CO_2$ gas laser can have a linewidth on the order of 75 kHz. The peak frequency of this signal corresponds to the frequency of the local oscillator beam $f_{lo}$ minus the frequency of the return radiation $f_r$. If the object to be imaged is at rest, $f_{lo} - f_r = 0$ and the peak frequency is at DC. A similar spike results from the system of FIG. 1a, but at a frequency equal to $f_2 - f_1$. This spike also occurs in the system of FIG. 1b, but at a frequency corresponding to the shift imparted by optical frequency shifter 180.

Figure 6B:
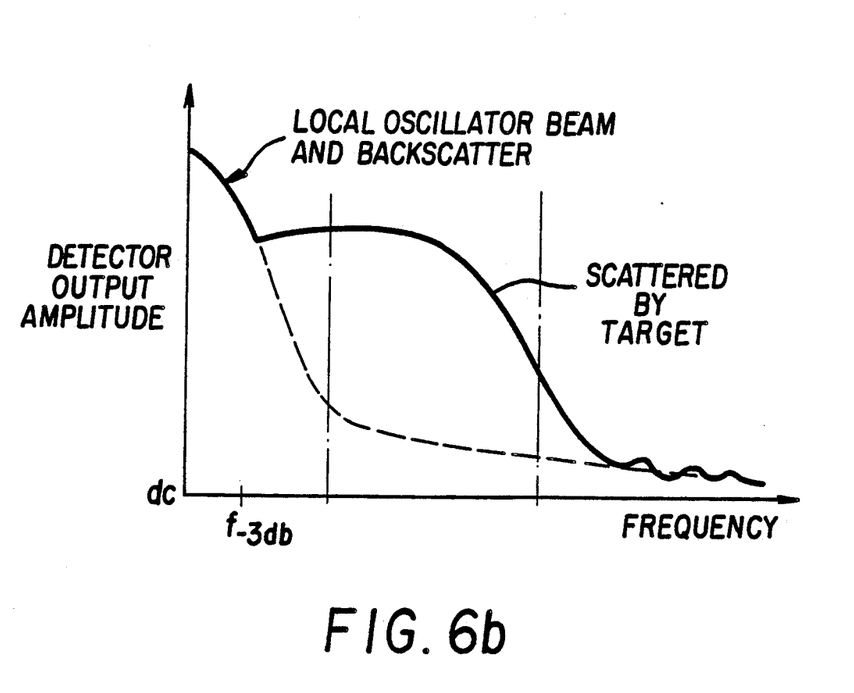

As shown in FIG. 6b, a signal corresponding to an object to be detected must fall outside the frequency range of the signal components corresponding to the local oscillator beam and internal backscatter to avoid being swamped out by these large signal components. Because the signal from the object to be detected is derived from the transmitted beam, the transmitted beam must be sufficiently frequency shifted to discriminate the signal corresponding to the object to be detected.

Conventionally, this frequency shift is obtained using modulating devices, shown as dashed boxes 190 and 192 in FIGS. 1a1c. The modulating devices 192 may comprise, for example, acousto-optic or electro-optic modulators alone or in combination with polarizers and/or birefringent retardation plates, etc., to modulate the frequency of or pulse the transmitted radiation and/or the local oscillator beam. Control circuitry 190 provides the necessary signals to drive the modulators 192 in accordance with conventional techniques In FIGS. 1a-1c, the control circuitry 190 directly modulates the output of the laser 102 and/or laser 112. Alternatively, modulating device 192 can be positioned after laser 102 to modulate the laser beam output by the laser in accordance with signals from control circuitry 190. In FIG. 1b, modulating device 190 can also be used to directly modulate the output of frequency shifting device 180.

Although the modulating means 190 and 192 allow the conventional systems of FIGS. 1a-1c to detect objects at rest, significant disadvantages result from the use of modulators 190 and 192. They are expensive and require complicated control circuitry to synchronize the movement of the scanning means 121 with the modulation of the laser beam to be transmitted. This significantly decreases the signal processing speed of conventional systems.

Alternatively, the systems of FIGS. 1a-1c can be used without the modulation devices 190 and 192, but only to detect moving objects. This implementation is based on the principles of the Doppler effect which imparts the necessary frequency shift to the transmitted radiation if the object is moving with sufficient speed. This implementation is disadvantageous in that the system cannot be used to detect objects at rest or objects moving at a speed which does not impart a sufficient Doppler frequency shift to the transmitted radiation to allow proper detection of the object to be detected

SUMMARY OF THE INVENTION

Accordingly, it is an object of the present invention to provide a laser radar detecting system and method for detecting objects, particularly slowly moving objects or objects at rest, without the requirement of conventional modulation devices and techniques.

Additional objects and advantages of the invention will be set forth in the description which follows or may be learned by practice of the invention. The objects and advantages of the invention may be realized and obtained by means of the instrumentalities and combinations particularly pointed out in the appended claims.

To accomplish these and other objects, and in accordance with the purposes of the invention as embodied and broadly described herein, a laser radar system for detecting objects is provided comprising a laser for generating a beam of radiation having a first frequency; a device for generating a local oscillator beam of radiation; a scanning device for scanning the beam of radiation across the object; a device for controlling the scanning rate of the scanning means; a device for receiving return radiation scattered by the object; a device for combining the return radiation with the local oscillator beam of radiation; a device for generating an electrical signal corresponding to the sum of thO return radiation and the local oscillator beam of radiation; and a filter device for filtering a portion of the electrical signal uniquely corresponding to the object; the scanning rate being selected to shift the first frequency by an amount sufficient to allow the filter device to filter the portion of the electrical signal corresponding to the object.

To further accomplish these and other objects, and in accordance with the purposes of the invention as embodied and broadly described herein, a method of detecting an object in a laser radar system comprises the steps of generating a laser beam of radiation having a first frequency; generating a local oscillator beam of radiation; scanning the laser beam of radiation across an object at a scanning rate sufficient to shift the first frequency; receiving return radiation scattered by the object; combining the return radiation with the local oscillator beam of radiation; generating an electrical signal corresponding to the sum of the return radiation and the local oscillator beam of radiation; and filtering a portion of the electrical signal corresponding to the object; the scanning rate being selected to shift the first frequency by an amount sufficient to allow the portion of the electrical signal corresponding to the object to be filtered.

BRIEF DESCRIPTION OF THE DRAWINGS

The accompanying drawings, which are incorporated in and constitute a part of the specification, illustrate a presently preferred embodiment and method of the invention and, together with the general description given above and the detailed description of the preferred embodiment and method given below, serve to explain the principles of the invention. In the drawings.

DESCRIPTION OF THE PREFERRED EMBODIMENT AND METHOD

Reference will now be made in detail to the presently preferred embodiment and method of the invention as illustrated in the accompanying drawings.

Figure 5:
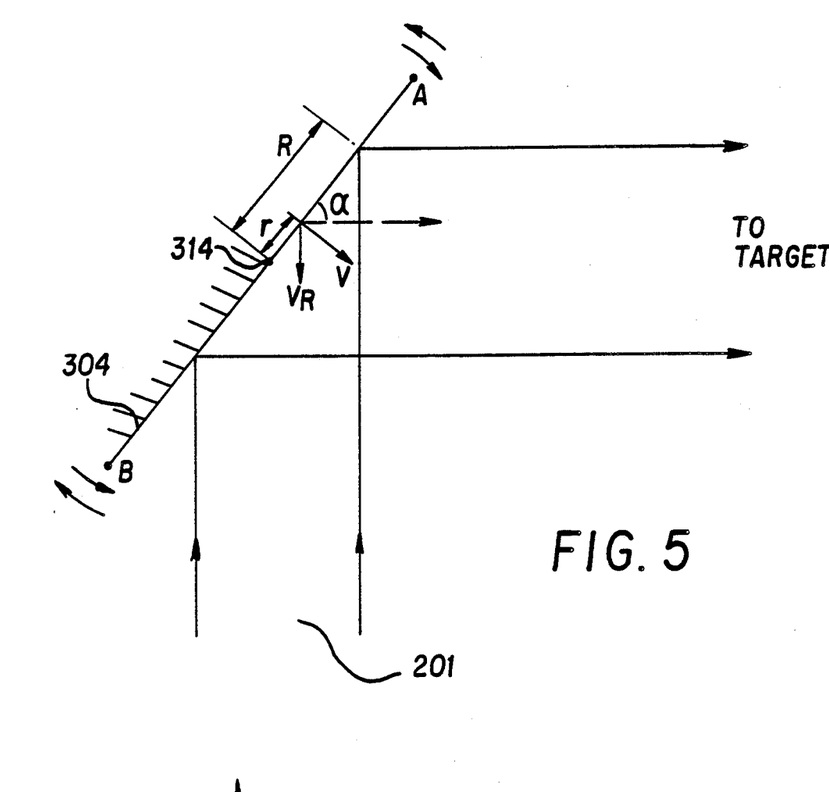
FIG. 5 represents a diagram demonstrating Doppler induced frequency modulation due to scanning motion, in accordance with the present invention.

FIG. 5 illustrates the concept behind imparting an adequate Doppler induced frequency shift to the transmitter beam in accordance with the present invention. The velocity, hence, the peak frequency deviation of scanning mirror 304 is largest at points A and B on the scanning mirror (for convenience only the y scanning mirror 304 of scanning device 208 is shown in FIG. 5). Accordingly, increasing the scanning field of view increases the maximum Doppler frequency shift. Consider the case of driving the mirow 304 with a sine wave of angular frequency $d\alpha/dt$. The component of velocity normal to the mirror surface at a distance r from the axis of rotation is v where, $$v = \frac{d\alpha}{dt} \cdot r$$

The component of velocity $v_R$ contributing to the Doppler shift in frequency is thus, $$v_R = \cos(\alpha(t)) \cdot v$$

Combining these two expressions, $v_R$ can be written as, $$v_R = \cos(\alpha(t)) \cdot \frac{d\alpha}{dt} \cdot r$$

where $\alpha(t)$ is the time varying angle between the mirror plane and the transmitted optical beam given by, $$\alpha(t) = \alpha_o + \frac{d\alpha}{dt} t$$

where $\alpha_o$ is the angle that the mirror makes with the transmitted radiation when no scanning occurs. For example, $\alpha_o$ may be 45 degrees.

Since $v_R << c$ (speed of light), the resulting Doppler shift due to $v_R$ is $$\Delta f_d = \frac{2 v_R}{\lambda}$$

is $\lambda$ the wavelength of the transmitted radiation. Substituting the expression for $v_R$ into the expression for $\Delta f_d$ gives, $$\Delta f_d = \frac{2}{\lambda} \cos\left(\alpha_o + \left(\frac{d\alpha}{dt} t\right)\right) \cdot \frac{d\alpha}{dt} \cdot r$$

Figure 2:
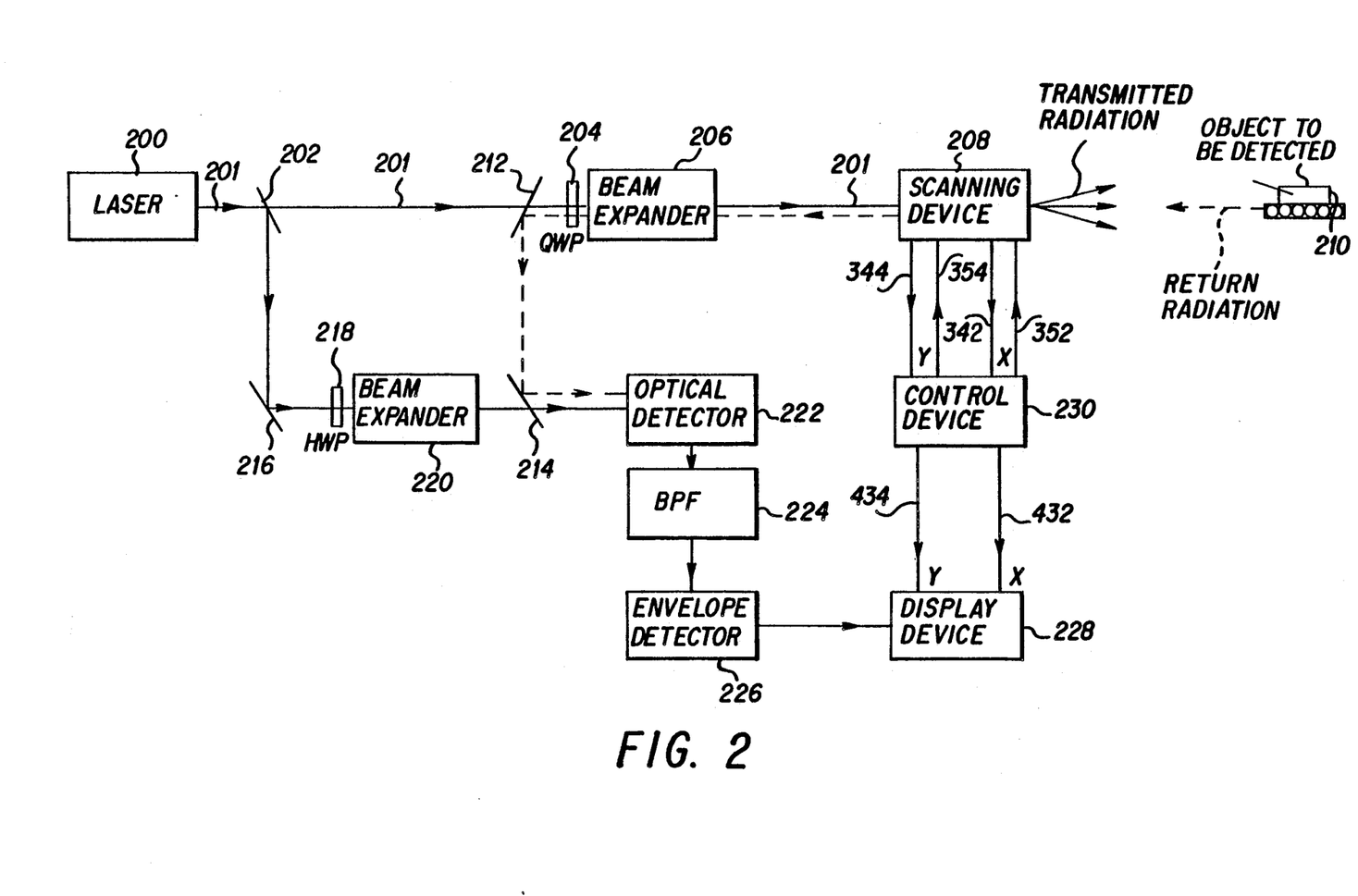
FIG. 2 is a block diagram of a preferred embodiment of a laser radar system in accordance with the present invention.

The maximum Doppler shift of the transmitted radiation due to the scanning motion of the mirror 304 can then be written as, $$\left(\frac{1}{2}\right) \max \Delta f_d = \left(\frac{2}{\lambda}\right) \cdot \frac{d\alpha}{dt} \cdot R$$

where R is the maximum distance of the transmitted and received photons from the scanning axis 314. If both the transmitted and return beams are Doppler shifted by ($\frac{1}{2}$)

max$\Delta f_d$, the highest frequency component at the output of optical detector 222 due to the y-scanning motion is, $$\max\Delta f_d = \frac{4}{\lambda} \cdot \frac{d\alpha}{dt} \cdot R.$$

Figure 3:
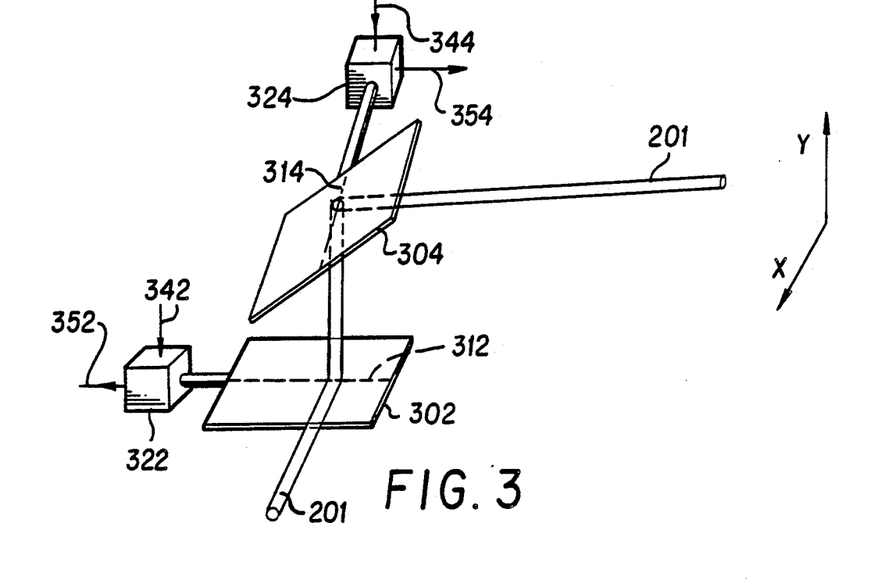
FIG. 3 is a diagram of a preferred embodiment of scanning device as shown in FIG. 2.

Hence, the expression for max$\Delta f_d$, the maximum detectable frequency depends on the scanning rate $$\frac{d\alpha}{dt},$$

the wavelength of the transmitted radiation $\lambda$, the maximum distance R of the transmitted and the received photons from the scanning axis 314 of the scanning mirror 304 and the angle $\alpha$ that the mirror makes with the transmitted radiation when no scanning occurs. Thus, in addition to increasing the scanning rate $$\frac{d\alpha}{dt}$$

the scanning mirrors, the diameter of the transmitter beam can be expanded to obtain scanning induced Doppler frequency shifts significant enough to detect the signal due to radiation scattered by the object.

Consider, for example, a $CO_2$ laser source expanded to a beam diameter of 3 cm (R=1.5 cm), and a scanning frequency $$\frac{d\alpha}{dt}$$

$300\pi$ rad/sec or 150 Hz. Substituting these values into the expression for max$\Delta f_d$, yields max$\Delta f_d$=5.3MHz, and $0 \leq \Delta fd \leq 5.3$MHz A bandpass filter (BPF) 224 is selected to filter out the signals in the desired frequency range based on predetermined system parameters to separate the return beam signal from the local oscillator signal and/or internal backscatter. Proper selection of the passband frequencies of BPF 224 (as shown in FIG. 6b), allows only the Doppler shifted signal corresponding to the return radiation scattered by the object to be detected, hence, slowly moving objects and objects at rest can be detected by the present invention, without the requirement of adding conventional modulating devices.

As shown in FIG. 2, a laser radar detecting system in accordance with the preferred embodiment of the present invention comprises a laser 200, a beam splitter 202, first and second beam expanders 206 and 220, a scanning device 208, a beam combiner 214, an optical detector 222, a bandpass filter (BPF) 224, an envelope detector 226, a control device 230, a display device 228, a quarter-wave plate 204, a half-wave plate 218, and reflecting mirrors 212 and 216, interconnected as shown.

The laser 200 may comprise, for example, a $CO_2$ laser or any other gas laser, a solid state laser or a semi-conductor laser (narrow linewidth). For example, a 5 watt $CO_2$ gas laser can be used for long distance object detection.

Beam splitter 202 may comprise a standard amplitude typ beam splitter, where most of the radiation is transmitted in the direction of beam expander 206 and the remainder is reflected to the mirror 216 (for example, 90 percent of the beam is transmitted to the beam expander 206 and the remaining 10 percent is reflected to the mirror 216).

Beam expanders 206 and 220 may comprise conventional Newtonian-type or Galilean-type beam expanders.

The quarter-wave plate 204 and the half-wave plate 218 may comprise conventional bifringent transmission wave plates. The fast and slow axes of the quarter-wave plate and half-wave plate are rotated to a 45° angle and a 90° angle, respectively, with respect to the plane of polarization of the radiation from laser 200.

The scanning device 208 may comprise, for example, scanning mirrors as shown in FIG. 3. In operation, the laser beam 201 output by laser 200 is reflected and scattered by the x-scanning mirror 302 and the y-scanning mirror 304, which are rotated about their respective axes 312 and 314 by servo motors 322 and 324, respectively. Control device 230 provides signals along lines 342 and 344 which drive the servo motors 322 and 324, respectively, at a sufficient rate to impart an adequate Doppler frequency shift to the transmitted radiation. Signals indicating the positions of mirrors 302 and 304 are output from the servo motors 322 and 324 via lines 352 and 354, respectively, to the control device 230 to synchronize scanning of the object to be detected with scanning of the display device electron beam (not shown).

Figure 4:
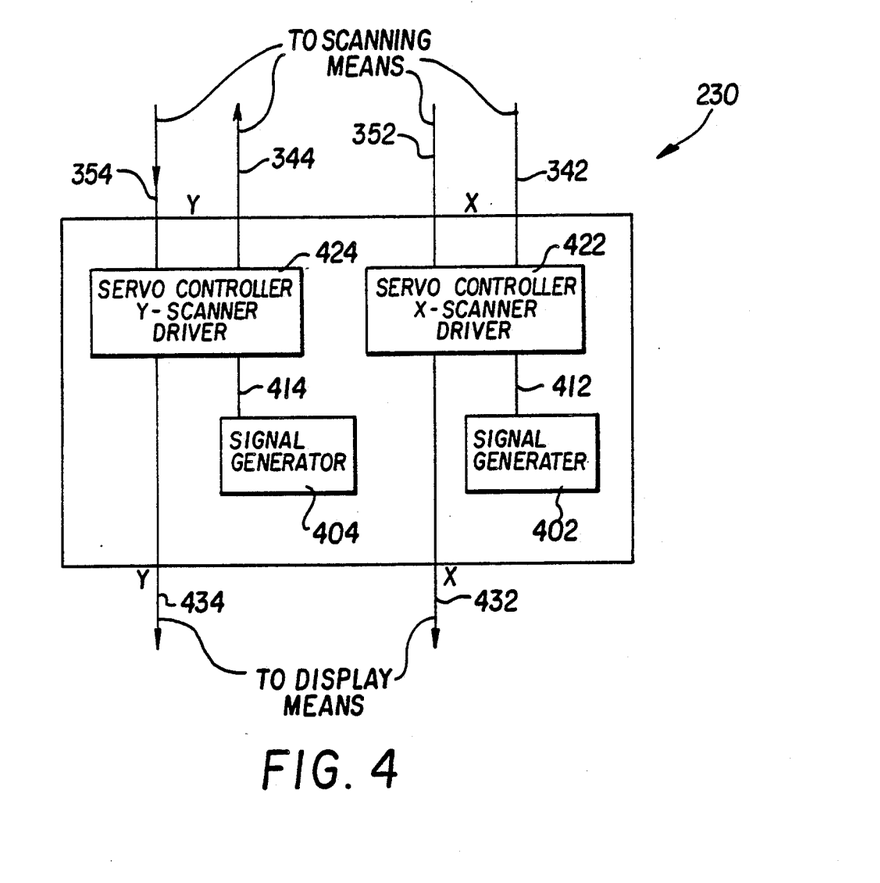
FIG. 4 is a diagram of a preferred embodiment of a control device as shown in FIG. 2.

The control device 230 may comprise, as shown in FIG. 4, for example, signal generators 402 and 404 to generate servo motor control signals for controlling the positions of the scanning mirrors 302 and 304, respectively. Any conventional signal generator can be used, provided the frequency of the output signal of signal generators 402 and 404 is sufficient to drive the scanning mirrors at a rate sufficient to impart an adequate Doppler frequency shift to the transmitted radiation. X and y scanner drivers/servo controllers 422 and 424 amplify the signals received on lines 412 and 414 to drive the servo motors 322 and 324, respectively. At the same time, x and y scanner drivers 422 and 424 receive return signals 352 and 354 from the servo motors 322 and 324 and generate voltages proportional to the positions of the scanning mirrors 302 and 304, respectively. These voltages are output on lines 432 and 424 to drive the x and y axis of display device 228 to synchronize the scanning of the object with the scanning of the electron beam on the display device 228. An example of the x and y servo controller/scanner device is the General Scanning Inc. DX series drivers.

Optical detector 222 produces a signal proportional to the square of the sum of the electric field due to the local oscillator beam $E_{lo}$ and the return beam $E_r$. Any conventional wideband optical detector providing this mixing method and signal output can be utilized as the detector 222.

Beam combiner 214, band pass filter 224 (active or passive), envelope detector 226, and reflecting mirrors 212 and 216 may comprise conventional devices for producing the corresponding described functions.

Referring to FIGS. 2-4, the operation of the preferred embodiment of the present invention will now be described. Laser 200 outputs a beam of radiation 201 with a predetermined polarization. The beam of radiation 201 is split by a beam splitter 202 so that, for example, 90percent of the optical power (transmitter beam) is transmitted toward beam expander 206, and, for example, 10 percent (local oscillator beam) is reflected to mirror 216. The local oscillator beam is reflected by mirror 216 toward half-wave plate 218, which rotates the beam by 90° and transmits the beam to the beam expander 220. Beam expander 220 increases the diameter of the local oscillator beam by, for example, a factor of three, in order to, for example, to simplify alignment.

The transmitter beam is transmitted through beam splitter 202 toward the quarter-wave plate 204 which causes the linearly polarized transmitter beam to become circularly polarized. The circularly polarized transmitter beam is then expanded by the beam expander 206 by, for example, a factor of six and transmitted to scanning device 208. In response to drive signals from control device 230, scanning device 108 rapidly scans the transmitter beam across the object to be detected. The scanning mirrors 302 and 304 must be driven at a rate sufficient to cause the desired Doppler frequency shift in the transmitter beam. For example, as shown in the calculations above, if the transmitted beam has a radius of 1.5cm, the scanning frequency should be selected to be 150Hz.

The scanned transmitter beam is scattered off the object to be detected 210 in all directions, including directly back into the detecting system. This direct reflection (the return beam) is received by the scanning device 208, directed back toward the beam expander 206, where it is compressed by, for example, a factor of six before being transmitted to quarter-wave plate 204, where the return beam is linearly polarized. Mirror 212 reflects the return beam toward the beam combiner 214 where it is combined with the local oscillator beam and transmitted to optical detector 222. Mirror 212 and beam combiner 214 are provided such that the return beam and the local oscillator beam enter the optical detector 222 with parallel face fronts and polarizations.

As discussed, the optical detector 222 produces a signal proportional to the sum of the electric field due to the local oscillator beam $E_{lo}$ and the return beam $E_r$. The detector output signal, as shown in FIG. 6a, comprises frequency components corresponding to the local oscillator beam and backscatter, and different frequency components corresponding to the object to be detected as a result of the Doppler frequency shift imparted by the scanning mirrors 302 and 304. Accordingly, the passband of bandpass filter 224 is selected to filter the signal uniquely corresponding to the object to be detected from the rest of the optical detector output signal.

The filtered signal is input to an envelope detector 226 which outputs a voltage to display device 228 proportional to the peak voltage levels of the signal output from the bandpass filter 224. Display device 228 may comprise a standard oscilloscope with control over the x- and y-scanning of the electron beam, control over the intensity (or z-axis) of the electron beam, and some type of persistence or memory control. Control device 230 outputs voltages on lines 432 and 434 to the x- and y-axis of the display device 228 to scan the electron beam of the display device 228 in synch with the scanning of the scanning mirrors 302 and 304. At the same time, the output signal from envelope detector 226 is applied to the z-axis of the display device to provide an image or the object to be detected as the electron beam scans the display device 228.

Thus, the present invention allows slowly moving objects and objects at rest to be detected without the requirement of adding conventional modulating devices. Further, the present invention can detect objects in motion, if the passband of BPF 224 is variable, similar, for example, to a tracking filter, or if the passband region of BPF 224 is large enough that the signal corresponding to the object falls within this passband.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A laser radar system for detecting an object, comprising:
   first laser means for generating a first beam of radiation having a first frequency;
   means for generating a local oscillator beam of radiation;
   scanning means for scanning said first beam of radiation across said object;
   means for controlling the scanning rate of said scanning means;
   means for receiving return radiation scattered by said object;
   means for combining said return radiation with said local oscillator beam of radiation;
   means for generating an electrical signal corresponding to the sum of said return radiation and said local oscillator beam of radiation; and
   means for filtering a portion of said electrical signal uniquely corresponding to said object; said scanning rate being selected to shift said first frequency by an amount sufficient to allow said filtering means to filter said portion of said electrical signal corresponding to said object.

2. A laser radar system according to claim 1, wherein said scanning means comprises:
   first and second scanning mirrors; and
   driving means for oscillating said first and second scanning mirrors about respective perpendicular axes;

3. A laser radar system according to claim 1, wherein said filtering means comprises a band pass filter for filtering out a selected band of frequencies corresponding to said portion of said electrical signal corresponding to said object.

4. A laser radar system according to claim 1, further comprising a beam expander for expanding said first beam of radiation prior to scanning said first beam of radiation.

5. A laser radar system according to claim 1, wherein said means for generating a local oscillator beam of radiation comprises a beam splitter for splitting said first beam of radiation to extract said local oscillator beam of radiation.

6. A laser radar system according to claim 1, wherein said means for providing a local oscillator beam comprises another laser means.

7. A laser radar system according to claim 1, wherein said object is in motion.

8. A laser radar system according to claim 1, wherein said object is at rest.

9. A laser radar system according to claim 1, further comprising, means for displaying said object in accordance with said filtered portion of said electrical signal.

10. A laser radar system according to claim 9, wherein said control means includes means for synchronizing said scanning means with said display means.

11. A method of detecting an object in a laser radar system, comprising the steps of:
generating a first beam of radiation having a first frequency;
generating a local oscillator beam of radiation;
scanning said first beam of radiation across said object at a scanning rate sufficient to shift said first frequency;
receiving return radiation scattered by said object;
combining said return radiation with said local oscillator beam of radiation;
generating an electrical signal corresponding to the sum of said return radiation and said local oscillator beam of radiation; and
filtering a portion of said electrical signal uniquely corresponding to said object; said scanning rate being selected to shift said first frequency by an amount sufficient to allow said portion of said electrical signal corresponding to said object to be filtered.

12. A method of detecting an object according to claim 11, wherein said filtering step includes the step of filtering a selected band of frequencies corresponding to said portion of said electrical signal.

13. A method of detecting an object according to claim 11, further comprising the step of expanding said first beam of radiation prior to said scanning step.

14. A method of detecting an object according to claim 11, wherein said step of generating a local oscillator beam of radiation includes the step of splitting said first beam of radiation to extract said local oscillator beam of radiation.

15. A method of detecting an object according to claim 11, wherein said step of generating a local oscillator beam of radiation includes the step of generating a second beam of radiation.

16. A method of detecting an object according to claim 11, wherein said object to be imaged is in motion.

17. A method of detecting an object according to claim 11, wherein said object to be imaged is at rest.

18. A method of detecting an object according to claim 11, further comprising the step of displaying said object in accordance with said filtered portion of said electrical signal.

19. A method of detecting an object according to claim 11, further comprising the step of synchronizing said scanning step with said displaying step.

* * * * *

UNITED STATES PATENT AND TRADEMARK OFFICE
CERTIFICATE OF CORRECTION

PATENT NO. : 5,000,567
DATED : March 19, 1991
INVENTOR(S) : MARK L. FLESHNER

It is certified that error appears in the above-indentified patent and that said Letters Patent is hereby corrected as shown below:

IN THE CLAIMS:

Claim 6:

Column 8, line 60, change "providing" to --generating--;
              line 60, after "beam" insert, --of radiation--;
              line 61, change "another" to --a second--.

Signed and Sealed this

Eighth Day of June, 1993

Attest:

MICHAEL K. KIRK

Attesting Officer    Acting Commissioner of Patents and Trademarks